United States Patent [19]

Oré et al.

[11] Patent Number: 4,853,201

[45] Date of Patent: Aug. 1, 1989

[54] RECOVERY OF $P_2O_5$ VALUES FROM PHOSPHORIC ACID HEMIHYDRATE CRYSTALS

[75] Inventors: Fernando Oré, Whittier, Calif.; Thomas E. Richards, Jasper, Fla.

[73] Assignee: Occidental Chemical Corporation, Niagara Falls, N.Y.

[21] Appl. No.: 217,186

[22] Filed: Jul. 11, 1988

[51] Int. Cl.$^4$ .............................................. C01B 25/16
[52] U.S. Cl. ..................................... 423/320; 423/555
[58] Field of Search ................................ 423/320, 555

[56] References Cited

U.S. PATENT DOCUMENTS 3,511,602  5/1970  Fitch et al. ........................ 423/320
3,745,208  9/1973  Bigot et al. ....................... 423/320
4,522,918  1/1971  Fitch et al. ........................ 423/320

FOREIGN PATENT DOCUMENTS 1094539  12/1967  United Kingdom ................ 423/320

*Primary Examiner*—Gregory A. Heller
*Attorney, Agent, or Firm*—James F. Tao; Richard D. Fuerle

[57] ABSTRACT

$P_2O_5$ values occluded in the crystals which are precipitated during the hemihydrate process for manufacturing phosphoric acid are recovered by dissolving and recrystallizing the hemihydrate crystals as dihydrate crystals in an acidic environment having a $P_2O_5$ concentration of from about 0.1% to about 10% and a free sulfate concentration in the range of about 0.1% to about 10%. Water is used to wash the dihydrate filter cake, and the filtrate from this wash is used to redissolve the hemihydrate crystals. The free sulfate values are preferably supplied to the dihydrate crystallizer as sulfuric acid.

20 Claims, 1 Drawing Sheet

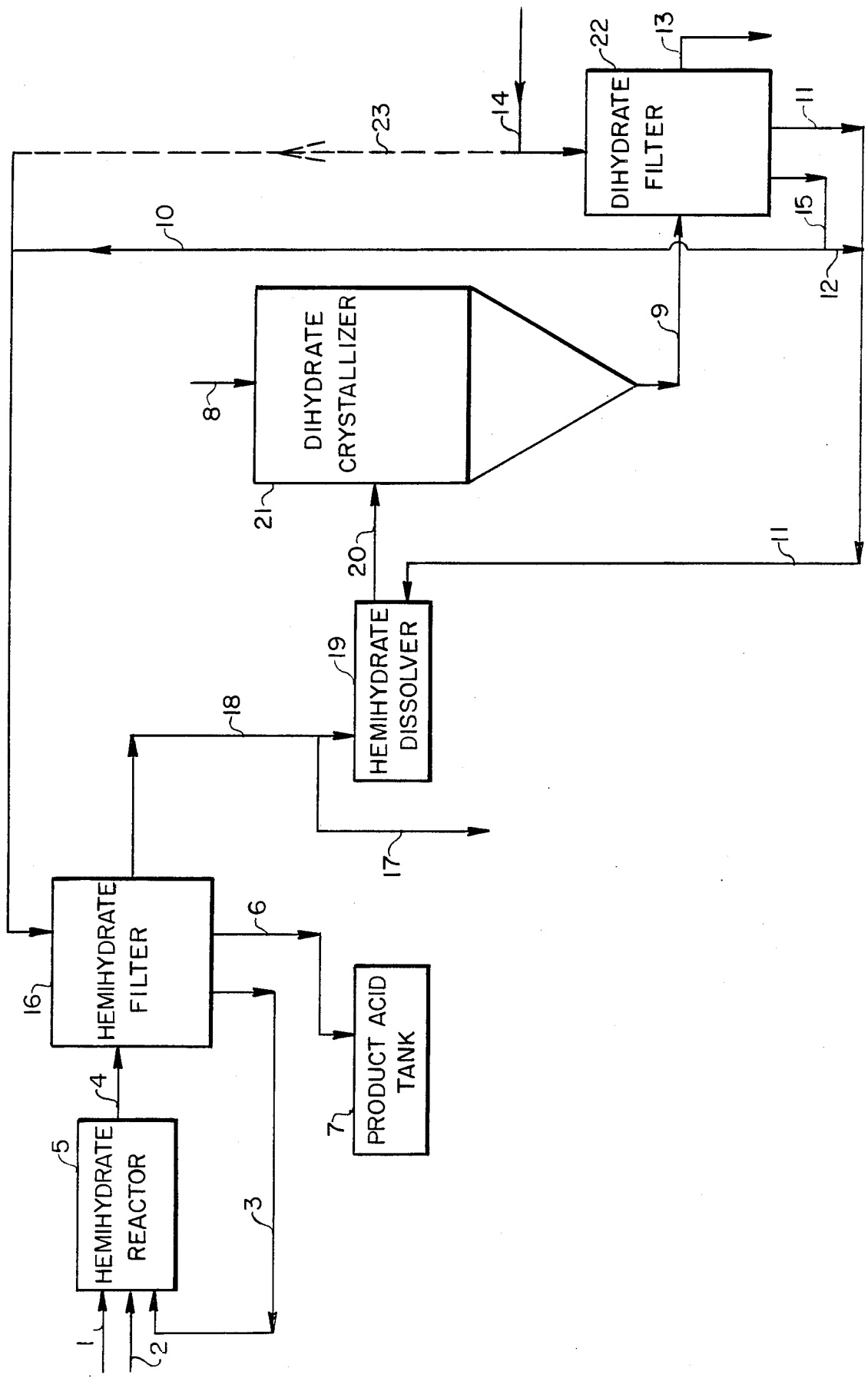

RECOVERY OF P$_2$O$_5$ VALUES FROM PHOSPHORIC ACID HEMIHYDRATE CRYSTALS

BACKGROUND OF THE INVENTION

This invention relates to an improved process for recovering P$_2$O$_5$ values contained in the hemihydrate crystals and unreacted calcium phosphate rock generated in the hemihydrate process for manufacturing phosphoric acid. The process of this invention is less dependent on external variables than prior art processes, and is more efficient both in terms of recovery time and yield.

The phosphoric acid, which is primarily used for agricultural purposes, is commonly manufactured today using the so-called "wet process". This process involves the processing of mined phosphate rock by solubilization with phosphoric acid and reaction with sulfuric acid to produce a phosphoric acid solution and insoluble calcium sulfate. In the dihydrate process, the phosphoric acid produced has a P$_2$O$_5$ concentration of from about 26% to about 30%, and the insoluble calcium sulfate is present in the dihydrate form (CaSO$_4$.2H$_2$O). The hemihydrate process results in a phosphoric acid product having a P$_2$O$_5$ concentration of from about 38% to about 50% and an insoluble calcium sulfate product which is in the hemihydrate form (CaSO$_4 \cdot \frac{1}{2}$H$_2$O). Further details of both processes are disclosed in U.S. Pat. Nos. 4,132,760, 4,196,172 and 4,220,630.

Since phosphoric acid concentrations of about 40% on a P$_2$O$_5$ basis or above are usually required for the production of phosphate fertilizer products, the hemihydrate process has a significant advantage over the dihydrate process in being capable of directly producing phosphoric acid within this concentration range. However, the hemihydrate process also has a number of significant limitations which appear to be inherent in the process, such as poor slurry filterability, low product recovery, cake conversion on the filter, scaling, etc. These limitations prevented the early commercialization of the hemihydrate process. As a result, the dihydrate process gained early acceptance in the industry, and became the conventional process.

Over the passage of time, the continuous rise in energy costs increased the incentive for the development of the more energy efficient hemihydrate process. Eventually, several commercial variations of the hemihydrate process emerged after overcoming some of the initial process limitations, and this started a trend in the phosphate industry toward the hemihydrate mode of operation.

Although economics generally favors the hemihydrate process over the dihydrate process, the hemihydrate process is not without its own inherent limitations as previously mentioned. One particular disadvantage of the hemihydrate process is recovery which can be 2% to 3% lower than in the dihydrate process. This lower recovery is due primarily to the more pronounced occlusion of P$_2$O$_5$ values in the calcium sulfate filter cake. These so-called "lattice bound losses" are due to several factors such as the substitution of phosphate in the crystal lattice of the hemihydrate crystals, the entrapping of phosphoric acid inside of the polycrystals formed during the hemihydrate process, and the formation of Al—F—P$_2$O$_5$ complexes on the hemihydrate crystal surfaces. Lattice bound losses increase with conditions that favor replacement of sulfate with phosphate, such as a higher product acid concentration and a lower free sulfate level in the phosphoric acid.

One way to recover the occluded P$_2$O$_5$ values, as well as the P$_2$O$_5$ values trapped in the unreacted calcium phosphate rock, is to recrystallize the hemihydrate crystals as dihydrate crystals. In this recrystallization process, the hemihydrate filter cake, which is discharged from the hemihydrate filter, is fed to a dihydrate phosphoric acid plant, or to a recrystallization section, where the hemihydrate crystals are dissolved and recrystallized as dihydrate crystals. This releases the occluded P$_2$O$_5$ from the crystals along with any other impurities normally retained in the filter cake. The liquid phase, which is separated from the dihydrate crystals during filtration, is phosphoric acid which normally has a concentration of 12% to 18% on a P$_2$O$_5$ basis. This filtrate, or dihydrate acid, is used to wash the hemihydrate filter cake on a hemihydrate filter. The resulting second filtrate from the hemihydrate filter is blended with product acid to form a recycle acid stream having a concentration in the range of 33% to 40% on a P$_2$O$_5$ basis. This recycle acid is returned to the hemihydrate reactor to dissolve the phosphate rock feed.

The hemihydrate slurry which is formed in the hemihydrate reactor is filtered on the hemihydrate filter to separate the filter cake from a phosphoric acid product normally having a concentration in the range of 40% to 46% on a P$_2$O$_5$ basis.

Theoretically, the use of a recrystallization stage to recrystallize calcium sulfate dihydrate should lead to the production of a stronger phosphoric acid product, i.e. one having a P$_2$O$_5$ concentration of 44% to 50%, as compared to the single stage hemihydrate process which can have a somewhat lower P$_2$O$_5$ concentration. The stronger acid should result in a larger amount of lattice-bound P$_2$O$_5$ formed during the crystallization, and this additional lattice-bound P$_2$O$_5$ should be recovered in the recrystallization stage and should eventually appear in the final acid product. In practice, however, due to the conditions required for recrystallization, optimum recovery is obtained at lower acid concentrations, usually in the range of 43% to 45% on a P$_2$O$_5$ basis.

The operation of the recrystallization stage is critical for recovery of P$_2$O$_5$ values since the rate of recrystallization decreases sharply with increasing concentration of the dihydrate acid. For instance, at a dihydrate acid concentration above about 20% on a P$_2$O$_5$ basis, the rate of recrystallization is too slow, resulting in incomplete recrystallization and low yield. This result could, if serious enough, render the process inoperable. In contrast, if the dihydrate acid concentration is too low, i.e. 12% on a P$_2$O$_5$ basis or less, a large recycle of the product acid would be required to satisfy the product phosphoric acid concentration requirements. This would reduce the overall process throughput, making the operation less efficient and more costly.

This interdependence of the hemihydrate and dihydrate sections of the process is a serious disadvantage, requiring the synchronization of both the hemihydrate and dihydrate processes which is not always possible. A realignment of both processes for synchronization necessitates additional down-time, adversely affecting the overall operating efficiency of the process, the actual recovery, and the overall process economics. In addition, a recrystallization scheme, such as outlined above, requires several hours for complete conversion of hemihydrate crystals to dihydrate crystals, and this is a significant disadvantage in any commercial process.

SUMMARY OF THE INVENTION

In accordance with the present invention, a process for recovering $P_2O_5$ values from hemihydrate crystals generated during the hemihydrate process for manufacturing phosphoric acid comprises converting the hemihydrate crystals to dihydrate crystals by recrystallization in a crystallizer having a phosphoric acid concentration in the range of about 0.1% to about 10% on a $P_2O_5$ basis, and a free sulfate concentration in the range of about 0.1% to 10%. The free sulfate concentration in the dihydrate crystallizer is maintained by the addition of sulfuric acid to the crystallizer. The phosphoric acid concentration is established by adding, as cake wash in the dihydrate filter, enough water to satisfy the hydration requirements of the hemihydrate crystals, water lost as entrainment in the dihydrate filter cake, any water that might be lost in evaporation in the dihydrate crystallizer, and water required to produce the required cake wash (dihydrate acid) for the hemihydrate filter. This results in a lower phosphoric acid concentration in the crystallizer. The crystallizer operates at low $P_2O_5$ and high sulfate levels, thereby reducing the hydration time, which is a major benefit of this process.

Additional advantages of the present invention include a substantially reduced conversion time for converting hemihydrate crystals to dihydrate crystals of less than one hour, and frequently less than 30 minutes, flexibility in controlling the impurity levels in the final product acid, substantially independent operation of the hemihydrate and dihydrate sections of the overall process, increased product recovery, and greater operating flexibility. This invention permits continued operation of the process, even if either the hemihydrate or dihydrate filter are down for maintenance.

BRIEF DESCRIPTION OF THE DRAWING

The FIGURE is a flowsheet of a preferred embodiment of the invention which illustrates the crystallization of hemihydrate filter cake, and its subsequent dissolution and recrystallization as dihydrate filter cake in the presence of sulfuric acid. Also shown in the FIGURE is the use of water to wash the dihydrate filter cake and the recycle of dihydrate acid to the hemihydrate crystal redissolver.

DESCRIPTION OF THE PREFERRED EMBODIMENTS

The hemihydrate process is a well-known industrial process for directly producing a phosphoric acid product having a concentration in the range of from about 38% to about 50% on a $P_2O_5$ basis. This is somewhat higher than the concentration of acid produced in the dihydrate process. A state of the art type of hemihydrate process which is suitable for use in the present invention is described in U.S. Pat. Nos. 4,132,760, 4,196,172 and 4,220,630, the respective disclosures of which are incorporated by reference herein. In these processes, the hemihydrate slurry produced by the hemihydrate reactors is filtered and the hemihydrate filter cake is dissolved in a hemihydrate filter cake "repulper" or dissolver. The repulping or dissolving operation occurs by contacting the hemihydrate filter cake with dihydrate recycle acid which is the second filtrate (or recycle acid) from the dihydrate filter cake washing process. This dissolved or "repulped" hemihydrate filter cake is then transferred to a dihydrate crystallizer which has a phosphoric acid concentration in the range of 0.1% to 10% on a $P_2O_5$ basis. This low concentration range of the phosphoric acid in the dihydrate crystallizer results from using water to wash the dihydrate filter cake, resulting in substantially diluted dihydrate acid, and it is an important feature of the present invention. In a dilute acidic environment, and in the presence of free sulfate levels of 0.1% to 10%, it has been found that satisfactory recrystallization of the hemihydrate crystals to the dihydrate form can be accomplished relatively quickly. This contrasts with prior art approaches which can take several hours or more for complete conversion of hemihydrate to dihydrate crystals. In the present invention, this conversion step usually can be accomplished in 30 minutes or less. Higher free sulfate levels shorten the recrystallization time requirements even further.

The dihydrate slurry from the dihydrate crystallizer is next filtered on a dihydrate filter to separate gypsum as a by-product. In the dihydrate filter, the slurry from the dihydrate crystallizer is washed with three countercurrent washes. The first countercurrent wash uses water, and the filtrate from this wash is returned to the dihydrate filter as a second filter cake wash. The dihydrate filter cake is next washed a third time with the filtrate from the second wash, and the filtrate from the third wash is returned to the hemihydrate cake dissolver as dihydrate recycle acid where it is used to dissolve the hemihydrate filter cake to control the concentration of solids. Most of the filtrate from the slurry feed to the dihydrate filter (first filtrate) is the dihydrate acid product which is used as cake wash in the hemihydrate filter. The remainder of the first filtrate is recycled to the hemihydrate cake dissolver to control the concentration of solids in the slurry at an optimum level for crystallization purposes.

Turning now to the drawing, phosphate rock (1), sulfuric acid (2), and recycled acid (3) from hemihydrate filter (16) are fed to the hemihydrate reactor (5) where the phosphate rock is dissolved and a hemihydrate slurry (4) is produced. The hemihydrate slurry is filtered in hemihydrate filter (16). In the hemihydrate filter, the hemihydrate slurry is washed countercurrently with hemihydrate filter cake wash (10), which is produced in the dihydrate filter (22). The filtrate from the hemihydrate filter is phosphoric acid product (6) which is transferred to the product storage tank (7). The phosphoric acid product typically has a concentration of 42% to 45% on a $P_2O_5$ basis. The hemihydrate filter cake wash filtrate is used to wash the hemihydrate filter cake countercurrently, typically in at least three wash cycles or phases, and is then returned to hemihydrate reactor (5) as recycle acid (3). This recycle acid is used in the hemihydrate reactor for dissolving phosphate rock. The product acid (6) is in effect the first filtrate, and the recycle acid (3) is the second filtrate from the hemihydrate filter. This portion of the process constitutes the primary hemihydrate portion in which a concentrated phosphoric acid product is generated for shipment and sale.

The hemihydrate filter cake (18) is transferred to a hemihydrate filter cake dissolver (19), where it is mixed with dihydrate recycle acid (11) from dihydrate filter (22). The dissolved hemihydrate filter cake (20) is then transferred to dihydrate crystallizer (21) where sufficient sulfuric acid (8) can be added to establish a free sulfate level in the crystallizer in the range of 0.1% to 10%. The sulfuric acid is used in the process to accelerate the conversion of hemihydrate crystals to dihydrate crystals. Free sulfate levels in the crystallizer of less than about 0.1% are not noticeably effective in accelerating this conversion, while free sulfate levels in excess of about 10% do not achieve any additional benefits, and may even be detrimental to the process. The sulfuric acid is recycled with the recovered acid (10) to the hemihydrate filter as hemihydrate filter cake wash, and ultimately recycled to the hemihydrate plant as recycled acid (3), thereby providing the additional benefit of reducing the sulfuric acid addition requirements to the hemihydrate reactor.

The amount of dihydrate recycle acid (11) which is fed to the hemihydrate filter cake dissolver (19) is adjusted, as required, for hemihydrate recrystallization in the form of dihydrate crystals and to maintain a slurry density in the range of 30% to 45% solids in the dihydrate crystallizer. Dihydrate crystallizer (21) is preferably a growth-type crystallizer which promotes the formation of dihydrate crystals with high filterability. This type of growth-type crystallizer is well-known in the industry, and a typical example of one such crystallizer which is used to form coarse hemihydrate crystals is disclosed in U.S. Pat. No. 4,220,630, the disclosure of which is incorporated by reference herein.

The dihydrate slurry (9) from the dihydrate crystallizer is transferred to dihydrate filter (22) where the dihydrate solids are separated from the acid. Here the dihydrate filter cake is preferably given at least three countercurrent washes. The first filtrate, that is, the slurry feed filtrate, is the recovered acid (15). The recovered acid (15), which has a $P_2O_5$ content of approximately 0.1% to about 10%, is recycled to the hemihydrate plant as hemihydrate filter cake wash (10). A part of this recovered acid (15) can be recycled, if desired, to the hemihydrate filter cake dissolver (19) as dihydrate recycle acid through by-pass (12) for control of solids concentration. The second filtrate from dihydrate filter (22) is the dihydrate recycle acid (11) which is used for dissolving the hemihydrate filter cake in the hemihydrate filter cake dissolver (19). This second filtrate (11) is the result of at least two countercurrent acid washes on the dihydrate filter (22), and it contains approximately 0.1% to about 8% $P_2O_5$. The first wash is with water, and the filtrate is recycled to the filter as the second wash, and recycled once again as the third wash or recycle acid (11).

The dihydrate filter cake (13), which is almost pure gypsum, can be used directly, or after additional clean-up, as a cement additive, or for construction work, etc.

The dihydrate filter cake wash used in the dihydrate filter is water (14). The amount of water used for this purpose should be sufficient to provide enough water for hydration of the hemihydrate filter cake, to supply water which may have been lost in the dihydrate filter cake entrainment, and to supply sufficient volume of recovered acid (10) to satisfy the hemihydrate filter cake wash requirements of the hemihydrate filter.

In an alternate mode of operation, the hemihydrate filter cake (18) from the hemihydrate filter (16) by-passes at least in part the recrystallization portion of the process, described immediately above, and is discharged directly to the hemihydrate pond through line (17). This allows a reduction of the level of impurities in the product acid (6) at the expense of lowering overall recovery. If all of the hemihydrate filter cake is discharged to the hemihydrate pond, water (14) will be diverted through line 23 and used as a substitute for the hemihydrate filter cake wash from line 10. In this mode of operation, the process becomes the equivalent of a single state hemihydrate process, i.e. with no recrystallization of hemihydrate crystals.

The advantages of the present invention include a substantially reduced conversion time of hemihydrate to dihydrate crystals in the dihydrate crystallizer, i.e. normally in less than one hour. Conversion times can be reduced even further by increasing the free sulfate level in the dihydrate crystallizer.

Another advantage of the proposed process is that the impurity level in the product acid can be controlled by the amount of hemihydrate filter cake being recrystallized. This can be adjusted to meet product acid quality requirements.

Additional advantages of this process are that the recrystallization stage of the process does not need to be synchronized to the operation of the hemihydrate plant and can be used without affecting the operation of the hemihydrate plant. In fact, the process of this invention increases product recovery from about 93% to 94% for a single stage hemihydrate operation, to 97% to 99%, while producing the same concentration of product acid, i.e. in the 40% to 46% range on a $P_2O_5$ basis.

Further advantages of the present process are the smaller size equipment required in the recrystallization stage, a higher operating factor, greater simplicity of operation, lower mechanical losses, and the capability of operating with or without recrystallization.

This process is also particularly suitable for operation without cooling pond water where a dry hemihydrate filter cake discharge is used. The recovered acid from the dihydrate filter replaces the pond water as hemihydrate filter cake wash, and $P_2O_5$ values are recovered and recycled back into the system.

The following examples are intended to illustrate various embodiments and advantages of the present invention without limiting it thereby.

EXAMPLE 1

A 50 gram sample of $CaSO_4.2H_2O$ seed crystals, 75 grams of hemihydrate solids and 375 grams of water were mixed in a 600 ml. standard Pyrex beaker. The hemihydrate solids were obtained from a commercial hemihydrate phosphoric acid facility. The mixture was added to the vessel and agitated using a 2-blade propeller, 2 inches in diameter and $\frac{3}{4}$ inches wide. The temperature was adjusted to 120° F. The slurry density after hydration was measured as 27% solids.

Samples of solids and slurry filtrate for analytical determination were taken at 20 minutes, 40 minutes, 80 minutes and 120 minutes from the start of the experiment. A small amount of sulfuric acid was added to the mixture to maintain excess free sulfate levels after conversion. The results of the experiment are shown below in Table 1:

TABLE 1

| | Hydration Time (min.) | | | | |
|---|---|---|---|---|---|
| | 0 | 20 | 40 | 80 | 120 |
| Solids | | | | | |
| Lattice Bound $P_2O_5$ | 1.01 | 0.36 | 0.30 | 0.24 | 0.23 |
| Unreacted rock $P_2O_5$ | 0.33 | 0.14 | 0.16 | 0.16 | 0.17 |
| $Al_2O_3$ | 0.47 | 0.22 | 0.22 | 0.22 | 0.28 |
| Hydrate water | 6.37 | 14.10 | 15.14 | 16.38 | 16.86 |
| Sludge density (% solids) | | | | | 27 |
| Hydration Liquor | | | | | |

TABLE 1-continued

|  | Hydration Time (min.) | | | | |
| --- | --- | --- | --- | --- | --- |
|  | 0 | 20 | 40 | 80 | 120 |
| $SO_4$ |  |  |  |  | 0.20 |
| $P_2O_5$ |  |  |  |  | 0.12 |
| $Al_2O_3$ |  |  |  |  | 0.01 |
| % $P_2O_5$ recovered | 0 | 62.7 | 65.7 | 70 | 70 |

EXAMPLE 2

The procedure of Example 1 was repeated except that 320 grams of water and 130 grams of hemihydrate solids were used. The total weight of the mixture remained at 500 grams. The results of this experiment are shown below in Table 2:

TABLE 2

|  | Hydration Time (min.) | | | | |
| --- | --- | --- | --- | --- | --- |
|  | 0 | 20 | 40 | 80 | 120 |
| Solids |  |  |  |  |  |
| Lattice Bound $P_2O_5$ | 1.01 | 0.31 | 0.32 | 0.28 | 0.24 |
| Unreacted rock $P_2O_5$ | 0.33 | 0.05 | 0.06 | 0.08 | 0.07 |
| $Al_2O_3$ | 0.47 | 0.05 | 0.07 | 0.08 | 0.07 |
| Hydrate water | 6.37 | 19.28 | 18.37 | 18.70 | 19.70 |
| Sludge density (% solids) |  |  |  |  | 38 |
| Hydration Liquor |  |  |  |  |  |
| $SO_4$ |  |  |  |  | 0.63 |
| $P_2O_5$ |  |  |  |  | 0.19 |
| $Al_2O_3$ |  |  |  |  | 0.04 |
| % $P_2O_5$ recovered | 0 | 73.1 | 72 | 73.2 | 76.9 |

EXAMPLE 3

The procedure of Example 1 was again repeated except that 300 grams of water and 150 grams of hemihydrate solids were used. The total weight of the mixture remained at 500 grams. The results of this experiment are shown below in Table 3:

TABLE 3

|  | Hydration Time (min.) | | | | |
| --- | --- | --- | --- | --- | --- |
|  | 0 | 20 | 40 | 80 | 120 |
| Solids |  |  |  |  |  |
| Lattice Bound $P_2O_5$ | 1.01 | 0.16 | 0.15 | 0.14 | 0.13 |
| Unreacted rock $P_2O_5$ | 0.22 | 0.08 | 0.08 | 0.07 | 0.06 |
| $Al_2O_3$ | 0.47 | 0.07 | 0.07 | 0.06 | 0.07 |
| Hydrate water | 6.37 | 18.92 | 17.88 | 19.01 | 18.74 |
| Sludge density (% solids) |  |  |  |  | 44 |
| Hydration Liquor |  |  |  |  |  |
| $SO_4$ |  |  |  |  | 1.04 |
| $P_2O_5$ |  |  |  |  | 0.19 |
| $Al_2O_3$ |  |  |  |  | 0.04 |
| % $P_2O_5$ recovered | 0 | 82.1 | 82.9 | 84.4 | 85.9 |

The results of Examples 1-3 demonstrate that the rate and extent of conversion of hemihydrate crystals to dihydrate cyrstals increases with the free sulfate levels in the recrystallizer over a range of sulfate levels of from 0.2% to 1.5%.

EXAMPLE 4

The procedure of Example 1 was again repeated, but this time a different sample of hemihydrate solids was used. The results of this experiment are shown below in Table 4:

TABLE 4

|  | Hydration Time (min.) | | | | |
| --- | --- | --- | --- | --- | --- |
|  | 0 | 20 | 40 | 80 | 120 |
| Solids |  |  |  |  |  |
| Lattice Bound $P_2O_5$ | 0.88 | 0.13 | 0.10 | 0.11 | 0.11 |
| Unreacted rock $P_2O_5$ | 0.30 | 0.05 | 0.03 | 0.04 | 0.05 |
| $Al_2O_3$ | 0.40 | 0.03 | 0.03 | 0.03 | 0.03 |
| Hydrate water | 6.35 | 19.34 | 19.91 | 19.33 | 19.36 |
| Hydration Liquor |  |  |  |  |  |
| $SO_4$ |  |  |  |  | 1.47 |
| $P_2O_5$ |  |  |  |  | 0.13 |
| $Al_2O_3$ |  |  |  |  | 0.04 |
| % $P_2O_5$ recovered | 0 | 84.8 | 89 | 87.3 | 87 |

EXAMPLE 5

A sample of hemihydrate filter cake was obtained from a commercial hemihydrate phosphoric acid facility after the fourth wash and prior to discharge. The entrapped water in the filter cake was immediately displaced with methanol, and the filter cake was subsequently filtered and dried at 120° F. Aliquots of the filter cake were weighed in plastic bottles for testing.

A large sample of phosphoric acid pond water was obtained and its sulfate content was raised to the range of 5% to 6% by the addition of sulfuric acid. After allowing the solids present in the pond water to settle, the clear liquor was weighed in plastic bottles and set aside for testing. Prior to the initiation of testing, the hemihydrate solids and water were preheated to 120° F. so that their mixing would not cause major temperature fluctuations.

The test was initiated by putting the contents of two bottles of hemihydrate solids and two bottles of acidified pond water into an agitated beaker. This slurry was continuously agitated and maintained at about 120° F. throughout the test. Each ½ hour for 6½ hours, approximately half of the beaker contents were removed, and one bottle of hemihydrate solids and another bottle of acidified pond water were added to the beaker to compensate for the sample which was withdrawn. The removed samples were filtered and the filtrate was saved for analysis. The filter cake was washed with methanol, dried and weighed, and a portion removed for analysis. This allowed performance of a component material balance for each ½-hour increment as well as for the overall run.

The composition of the original hemihydrate solids and acidified pond water, as well as the composition of solids and liquors sampled at several hydration times, are shown in Table 5 below:

TABLE 5

| Time, Min. | Solids | | | | | | | | | | Liquid Phase | | | | | | | |
| --- | --- | --- | --- | --- | --- | --- | --- | --- | --- | --- | --- | --- | --- | --- | --- | --- | --- | --- |
|  | $P_2O_5$* | $P_2O_5$** | CaO | $SO_4$ | F | MgO | $Al_2O_3$ | $Fe_2O_3$ | $SiO_2$ | $H_2O$*** | $P_2O_5$ | CaO | $SO_4$ | F | MgO | $Al_2O_3$ | $Fe_2O_3$ | $SiO_2$ |
| 0 | 0.52 | 0.67 | 33.50 | 57.50 | 0.87 | 0.05 | 0.28 | 0.06 | 4.73 | 4.91 | 2.47 | 0.10 | 4.81 | 1.02 | 0.04 | 0.09 | 0.04 | 0.73 |
| 30 | 0.26 | 0.34 | 30.96 | 57.39 | 0.48 | 0.06 | 0.11 | 0.03 | 4.34 | 14.91 | 3.2 | 0.10 | 4.96 | 1.33 | 0.06 | 0.21 | 0.05 | 0.96 |
| 60 | 0.23 | 0.35 | 30.85 | 56.49 | 0.40 | 0.05 | 0.08 | 0.03 | 4.98 | 14.41 | 3.0 | 0.10 | 5.15 | 1.31 | 0.07 | 0.21 | 0.05 | 0.92 |
| 90 | 0.29 | 0.28 | 31.29 | 55.95 | 0.37 | 0.02 | 0.10 | 0.04 | 4.89 | 15.10 | 2.91 | 0.10 | 5.20 | 1.32 | 0.06 | 0.22 | 0.05 | 1.00 |
| 120 | 0.22 | 0.39 | 31.25 | 57.58 | 0.37 | 0.05 | 0.08 | 0.03 | 4.47 | 14.89 | 2.92 | 0.10 | 5.01 | 1.33 | 0.07 | 0.22 | 0.06 | 0.96 |

TABLE 5-continued

| Time, Min. | Solids | | | | | | | | | | Liquid Phase | | | | | | | |
|---|---|---|---|---|---|---|---|---|---|---|---|---|---|---|---|---|---|---|
| | $P_2O_5$* | $P_2O_5$** | CaO | $SO_4$ | F | MgO | $Al_2O_3$ | $Fe_2O_3$ | $SiO_2$ | $H_2O$*** | $P_2O_5$ | CaO | $SO_4$ | F | MgO | $Al_2O_3$ | $Fe_2O_3$ | $SiO_2$ |
| 150 | 0.26 | 0.43 | 30.78 | 39.96 | 0.43 | 0.01 | 0.12 | 0.03 | 3.75 | 15.58 | 2.96 | 0.10 | 5.01 | 1.36 | 0.07 | 0.22 | 0.06 | 0.99 |
| 180 | 0.24 | 0.44 | 30.49 | 42.89 | 0.41 | 0.01 | 0.12 | 0.03 | 4.19 | 16.21 | 2.92 | 0.10 | 5.26 | 1.37 | 0.06 | 0.22 | 0.06 | 0.93 |
| 210 | 0.25 | 0.36 | 31.15 | 50.44 | 0.35 | 0.01 | 0.11 | 0.03 | 3.72 | 14.49 | 2.90 | 0.10 | 5.01 | 1.37 | 0.07 | 0.22 | 0.06 | 0.99 |
| 240 | 0.24 | 0.35 | 31.04 | — | 0.41 | 0.01 | 0.12 | 0.04 | 3.92 | 14.68 | 2.93 | 0.10 | 4.92 | 1.30 | 0.06 | 0.23 | 0.06 | 0.96 |
| 390 | 0.28 | 0.31 | 31.33 | 58.37 | 0.48 | 0.01 | 0.10 | 0.03 | — | 14.79 | 2.99 | 0.10 | 5.11 | 1.30 | 0.06 | 0.23 | 0.06 | 0.98 |

*Lattice Bound.
**Unreacted Rock.
***Water of hydration.

While particular embodiments of the invention have been described herein, modifications and variations thereof will occur to those skilled in the art. It is to be understood, therefore, that the appended claims are intended to cover such modifications and variations which are within the scope and spirit of this invention.

What is claimed is:

1. In a process for recovering $P_2O_5$ values from a first aqueous slurry of calcium sulfate hemihydrate crystals where
   (1) said first slurry is filtered in a hemihydrate filter to form a product filtrate containing said $P_2O_5$ values and a calcium sulfate hemihydrate filter cake;
   (2) said hemihydrate filter cake is transported to a hemihydrate filter cake dissolver where said hemihydrate filter cake is dissolved;
   (3) said dissolved hemihydrate filter cake is transported to a separate dihydrate crystallizer where a second aqueous slurry, of calcium sulfate dihydrate crystals, is formed; and
   (4) said second slurry is transported to a dihydrate filter, separate from said hemihydrate filter, where said second slurry is filtered to form a dihydrate filter cake and a first filtrate, the improvement which comprises
      (a) maintaining the free sulfate ion concentration in said dihydrate crystallizer between about 0.1 and about 10%; and
      (b) maintaining the phosphoric acid concentration in said dihydrate crystallizer between about 0.1 and about 10% on a $P_2O_5$ basis.

2. The process of claim 1 wherein the free sulfate ion concentration in said dihydrate crystallizer is maintained by the addition of sulfuric acid to said crystallizer.

3. The process of claim 1 wherein said calcium sulfate dihydrate filter cake is washed with water.

4. The process of claim 3 wherein at least a portion of said first filtrate is used to wash said calcium sulfate hemihydrate filter cake.

5. The process of claim 4 wherein said dihydrate filter cake is countercurrently washed with the filtrate from said water wash to produce a second filtrate, and said second filtrate is used to dissolve said calcium sulfate hemihydrate filter cake in said hemihydrate filter cake dissolver.

6. The process of claim 5 wherein a portion of said first filtrate is diverted to supplement said second filtrate.

7. The process of claim 5 wherein gypsum is produced as a solid by-product from said dihydrate filter.

8. The process of claim 4 wherein a portion of said calcium sulfate hemihydrate filter cake is diverted to a cooling pond.

9. The process of claim 4 wherein said product filtrate has a phosphoric acid concentration of about 40% to 46% on a $P_2O_5$ basis.

10. The process of claim 1 wherein the conversion time from said calcium sulfate hemihydrate crystals to said calcium sulfate dihydrate crystals is less than about 1 hour.

11. The process of claim 1 wherein said phosphoric acid cocentration is maintained by the addition of water to wash said calcium sulfate dihydrate filter cake.

12. The process of claim 1 wherein said second slurry is 30 to 45% solids in said dihydrate crystallizer.

13. The process of claim 1 wherein said dihydrate crystallizer is a growth-type crystallizer.

14. The process of claim 10 wherein said conversion time is less than 30 minutes.

15. A process for recovering $P_2O_5$ values from calcium sulfate hemihydrate crystals generated during the hemihydrate process for manufacturing phosphoric acid comprising:
   (1) washing said hemihydrate crystals on a hemihydrate filter with a portion of a first filtrate from a dihydrate filter, forming a hemihydrate filter cake and a product filtrate;
   (2) dissolving said hemihydrate filter cake with a second filtrate from said dihydrate filter;
   (3) recrystallizing said dissolved hemihydrate filter cake in a separate dihydrate crystallizer as calcium sulfate dihydrate crystals, at a free sulfate ion concentration of 0.1 to 10%, and a phosphoric acid concentration of 0.1 to 10% on a $P_2O_5$ basis;
   (4) filtering said dihydrate crystals on said dihydrate filter, separate from said hemihydrate filter, to form a dihydrate filter cake and said first filtrate; and
   (5) washing said dihydrate filter cake countercurrently on said second filter with water to form said second filtrate.

16. The process of claim 15 wherein said free sulfate concentration is maintained by the addition of sulfuric acid.

17. The process of claim 15 wherein said product filtrate has a concentration of about 40% to 46% on a $P_2O_5$ basis.

18. The process of claim 15 wherein said hemihydrate crystals are converted to said dihydrate crystals in 1 hour or less.

19. The process of claim 18 wherein said hemihydrate crystals are converted to said dihydrate crystals in less than 30 minutes.

20. The process of claim 16 wherein a portion of said hemihydrate filter cake is not used to form said slurry, but is disposed of.

* * * * *